United States Patent
Shimano et al.

(10) Patent No.: US 6,348,422 B1
(45) Date of Patent: Feb. 19, 2002

(54) MOISTURE-PERMEABLE WATERPROOF FABRIC, AND MOISTURE PERMEABLE RESIN FILM BACKED WITH RELEASE PAPER TO BE USED FOR THE PRODUCTION OF THE FABRIC

(75) Inventors: Yasunao Shimano; Masashi Mukai; Kenji Nitta, all of Ishikawa-ken (JP)

(73) Assignee: Komatsu Seiren Co., Ltd., Ishikawa-ken (JP)

( * ) Notice: Subject to any disclaimer, the term of this patent is extended or adjusted under 35 U.S.C. 154(b) by 0 days.

(21) Appl. No.: 09/319,462

(22) PCT Filed: Oct. 22, 1998

(86) PCT No.: PCT/JP98/04795

§ 371 Date: Jun. 7, 1999

§ 102(e) Date: Jun. 7, 1999

(87) PCT Pub. No.: WO99/20465

PCT Pub. Date: Apr. 29, 1999

(30) Foreign Application Priority Data

Oct. 23, 1997 (JP) ............................................. 9-291078

(51) Int. Cl.$^7$ ............................ B32B 27/04; B32B 5/18; B32B 5/22; B32B 27/12
(52) U.S. Cl. ............................. 442/85; 442/76; 442/79; 442/86
(58) Field of Search .............................. 422/76, 79, 85, 422/86

(56) References Cited

U.S. PATENT DOCUMENTS

| | | | | |
|---|---|---|---|---|
| 4,554,198 A | | 11/1985 | Von Blücher et al. | |
| 5,308,689 A | * | 5/1994 | Shinkai et al. | 428/229 |
| 5,626,950 A | * | 5/1997 | Shimano et al. | 442/76 |
| 5,753,568 A | * | 5/1998 | Shimano et al. | 442/64 |

FOREIGN PATENT DOCUMENTS

| | | |
|---|---|---|
| EP | 0 603 410 | 6/1994 |
| JP | 5-309793 | 11/1993 |
| JP | 7-9631 | 1/1995 |

* cited by examiner

*Primary Examiner*—Terrel Morris
*Assistant Examiner*—Arti R. Sinah
(74) *Attorney, Agent, or Firm*—Burns, Doane, Swecker & Mathis, L.L.P.

(57) ABSTRACT

A moisture-permeable waterproof fabric comprising a textile fabric and a moisture-permeable resin film containing a non-porous urethane resin layer formed on at least one side thereof, wherein the moisture-permeable waterproof fabric has a moisture permeability of 15,000 g/m$^2$·24 hr or greater according to the potassium acetate method, a moisture condensation of no more than 5 g/m$^2$·hr and a water pressure resistance of 20,000 mmH$_2$O or greater, and a release-sheet attached moisture-permeable resin film comprising a release sheet and a moisture-permeable resin film formed thereon containing a non-porous urethane resin layer.

3 Claims, No Drawings

MOISTURE-PERMEABLE WATERPROOF FABRIC, AND MOISTURE PERMEABLE RESIN FILM BACKED WITH RELEASE PAPER TO BE USED FOR THE PRODUCTION OF THE FABRIC

TECHNICAL FIELD

The present invention relates to a moisture-permeable waterproof fabric with excellent moisture permeability and resistance to moisture condensation, and to a moisture-permeable resin film provided with a release sheet, which is used for production of the moisture-permeable waterproof fabric.

BACKGROUND ART

Moisture-permeable waterproof fabrics have traditionally been obtained by a publicly known process whereby a urethane resin film is formed on a release sheet, and is further coated with a urethane resin as an adhesive and dried, after which a woven fabric or knitted fabric is thermally compressed thereon to obtain a moisture-permeable waterproof fabric. Improvements have already been achieved in the performance of such moisture-permeable waterproof fabrics, but their object has been enhanced moisture permeability as measured by the calcium chloride method, along with improved water pressure resistance. Such improvements are aimed at obtaining more comfortable, reliable water-permeable waterproof fabrics. However, Sen'i Journal, Vol.41, No.11, pp.415–425 (1985) highlights the following problems connected with measurement by calcium chloride.

(1) An air layer is present at the end where the measuring target sample and vapor generating source are and vapor release diffusion occurs, constituting a barrier against movement of the vapor.

(2) The distance between the calcium chloride and the measuring target sample varies with time due to moisture absorption, so that the vapor permeation decreases as time passes.

(3) Because of the low volume of moisture absorbent, measurement values of highly moisture-permeable materials are similar, making it difficult to distinguish between such materials.

When evaluating moisture permeability in its connection with comfort it has been common to employ the method of JIS L-1099 A-1 (calcium chloride method) as mentioned above, but Hoechenstein Laboratories, Germany has established a comfort evaluation method using an artificial skin model, which has been registered as ISO11092.

The Sen'i Journal also teaches that a negative correlation exists between the moisture permeability resistance $R_{et}$ of the skin model and the moisture permeability in the potassium acetate method.

However, ISO11092 has been recognized as a more practical comfort evaluation method, and it is effective as a means of evaluating actual wearing comfort, similar to the JIS L-1099 potassium acetate method (B-1 method). On the other hand, there is absolutely no correlation between the moisture permeabilities in the calcium chloride method (A-1 method) and the potassium acetate method (B-1 method). The feature of measurement by the potassium acetate method is that the film is contacted directly with liquid water, and the rate of diffusion of water into the film or the rate of the process from dissolution to evaporation is measured. Thus, in order to achieve excellent measurement results by this measuring method it is necessary for the resin to be provided with a chemical structure or fine porous structure which allows easy movement of liquid moisture.

When the atmospheric temperature falls during actual wear, water droplets are formed and adhere to the inside of the clothing. In this condition moisture condensation, or formation and adhesion of water droplets occurs due to the difference in temperature between the outside air and the inside of the clothing, regardless of any considerable moisture permeability exhibited at a constant temperature (calcium chloride method), and this results in the problem of loss of body temperature.

For example, when the moisture condensation property is evaluated by a method in which a beaker containing hot water at 40° C. is placed over the urethane side of a measuring sample after which the cover is sealed and the amount of water adhering to the film side is measured after standing in an atmosphere of 10° C., 65% RH, moisture condensation can only be prevented by a performance whereby the adhered water droplets are rapidly absorbed and released out of the clothing material, and therefore the degree of moisture permeability in the potassium acetate method contributes substantially to the actual comfort in the clothing interior.

In practice, the effect of inhibiting moisture condensation is low even if the moisture permeability is high according to calcium chloride. The prior art has concentrated on improving the moisture permeability by calcium chloride while also improving the water pressure resistance, but has not attempted to improve the moisture permeability by the potassium acetate method which is more accurately related to comfort, and therefore the resulting moisture-permeable waterproof fabrics cannot necessarily be considered comfortable for actual use.

Urethane resins used to obtain moisture-permeable waterproof fabrics by lamination methods are hydrophilic ether-based polyurethane resins, and they are usually prepared as polyether-type urethanes by introduction of hydrophilic groups, such as a polyethylene glycol group or a pluoronic group which is a copolymer of ethylene glycol and propylene glycol.

In a conventionally employed method, a one-component type polyurethane resin film is formed as the surface coating on a release sheet, and then a two-component type adhesive comprising a hydrophilic polyether-based polyurethane resin is used for adhesion with the fabric. In this conventional method, however, the moisture permeability according to the B-1 method which correlates with actual comfort is not always high, being 5000 $g/m^2 \cdot 24$ hr or less, and it is not possible to achieve high moisture permeability of 15,000 $g/m^2 \cdot 24$ hr and greater. Also, because of the low absorption of liquid moisture, it is difficult to inhibit moisture condensation which occurs on the urethane film surface.

DISCLOSURE OF THE INVENTION

It is therefore an object of the present invention to overcome these problems by providing a moisture-permeable waterproof fabric with good comfort and highly reliable waterproofness, which produces no steaminess or moisture leakage even when employed under harsh conditions of wind and rain or intense exercise.

In order to achieve this object, the invention provides a moisture-permeable waterproof fabric comprising a textile fabric and a moisture-permeable resin film containing a non-porous urethane resin layer formed on at least one side thereof, wherein the moisture-permeable waterproof fabric has a moisture permeability of 15,000 g/m$^2$·24 hr or greater according to the potassium acetate method, a moisture condensation of no more than 5 g/m$^2$·hr and a water pressure resistance of 20,000 mmH$_2$O or greater.

The invention further provides a release sheet-attached moisture-permeable waterproof resin film which comprises a release sheet and a moisture-permeable resin film formed thereon containing a non-porous urethane resin layer.

As mentioned above, a conventional method for obtaining moisture-permeable waterproof fabrics is known whereby a surface layer comprising a hydrophilic polyurethane resin is formed on a release sheet, after which an adhesive comprising a hydrophilic polyurethane is coated and dried thereon for attachment to a textile fabric such as a woven fabric or knitted fabric. Improvements have also been proposed for enhanced moisture permeability and water pressure resistance of such moisture-permeable waterproof fabrics; however, there have been no proposed means for improving moisture permeability according to the potassium acetate method (B-1 method), which evaluates the actual wearing comfort. According to the prior art, the hydrophilic polyurethane resin film has a moisture swelling degree in the range of 10% at most. The moisture swelling degrees of adhesive films obtained by curing the adhesives with isocyanates are also in the range of 10% or lower. The moisture-permeable waterproof fabrics obtained by attaching these materials to textile fabrics have moisture permeability of at most 5000 g/m$^2$·24 hr according to the A-1 method, and moisture permeability of no greater than 5000 g/m$^2$·24 hr by the B-1 method as well.

In contrast, the moisture-permeable waterproof fabrics according to the present invention have a moisture permeability of about 5000 g/m$^2$·24 hr according to the A-1 method but have very high moisture permeability of 15,000–40,000 g/m$^2$·24 hr according to the B-1 method, depending on the base fabric used. Also, evaluation of the moisture condensation reveals that while fabrics produced by the prior art exhibit about 50 g/m$^2$·hr, the moisture-permeable waterproof fabrics of the invention exhibit 5 g/m$^2$·hr or less, for very excellent wearing comfort. Movement of water vapor in the non-porous film involves a process whereby moisture in the film undergoes dissolutions→diffusion→evaporation from the film, and therefore materials with high moisture solubility also have high moisture permeability; this is measured by the weight proportion of water absorbed (moisture swelling) after immersion of the film in water for a prescribed time, and it was found that the moisture swelling has a correlation with the moisture permeability measured by the potassium acetate method.

The urethane resin used to form the non-porous urethane resin layer according to the invention is preferably a hydrophilic one-component type polyurethane resin with a moisture swelling degree of 60% or greater, and specifically it may be a urethane comprising a polyether diol containing organic diisocyanate and oxyethylene groups and a chain extender, such as disclosed in Japanese Examined Patent Publication No. 3-42354, the resin having an oxyethylene group content of 20–80 wt %, and from the standpoint of improved moisture permeability, preferably an oxyethylene group content of at least 50 wt %.

The adhesive is not particularly limited, but it is preferred to use a two-component type polyurethane resin with a moisture swelling degree of at least 20% as the urethane resin used to form the adhesive layer, and those containing at least 20 wt % oxyethylene groups are preferred. The isocyanate used for curing of the adhesive is preferably aliphatic rather than aromatic, from the standpoint of moisture permeability. More preferred are those with hydrophilic groups, such as the one listed as No. 7-823 in the Chemicals Examination Law List.

On the other hand, from the viewpoint of easier adhesion of the moisture-permeable waterproof film to the textile fabric, it is acceptable to use, for example, a hot melt adhesive comprising a hot melt urethane resin. Hot melt urethane resins are one-component type polyurethane resins, and they begin to flow at 50–130° C. They then express adhesive strength when adhered by thermal compression onto an adherend and cooled. Such adhesives include commercially available solutions of the aforementioned hot melt urethane resins in mixed solvents such as methyl ethyl ketone/dimethylformamide to solid concentrations of about 30–70%.

As a specific method of producing moisture-permeable waterproof fabrics there may be used a dry laminate method in which the urethane resin solution is coated onto a release sheet and dried at a temperature of about 120° C. to form a non-porous urethane resin layer, after which a knife coater or gravure coater is used to coat the entire surface or points thereof with an adhesive, and then the solvent in the adhesive is removed by drying to form an adhesive layer and a roll heated to about 120° C. is used for thermal compression against a textile fabric such as a woven fabric or knitted fabric.

Useful release sheets for the polyurethane resin according to the invention include laminates of polypropylene films on paper with a weight of about 50–150 g/m$^2$, and similar paper surface-coated with silicone resins. The gloss of the release sheet may be a mirror, semi-dull or full-dull type, and the gloss can be controlled by embossing treatment. According to the invention, the type of release sheet is not particularly restricted and any desired type may be used.

The present invention also encompasses moisture-permeable waterproof fabrics wherein there is further formed on the non-porous urethane resin layer a non-porous film which is a two-component type polyurethane resin whose coating has a moisture swelling degree of at least 50%. Moisture-permeable waterproof fabrics obtained in this case have higher water pressure resistance and greater surface strength than those with a non-porous urethane resin layer alone.

Such high waterproof properties and comfort are required for such uses as mountaineering. If the coated resin has a moisture swelling degree of less than 50% the moisture permeability is lower than with a non-porous urethane resin layer alone, but within the range of the invention the moisture permeability measured by the potassium acetate method (B-1 method) is instead improved.

The two-component type polyurethane resin used here is a urethane resin which has been rendered hydrophilic by modification with polyethylene glycol groups and the like. Also, the urethane resin solution coated as the urethane resin film is one which contains N,N-dimethylformamide (DMF) in the range of 10% or less. That is, it may contain no N,N-dimethylformamide.

Other solvents which may be used instead of N,N-dimethylformamide as the solvent in the urethane resin solution used to obtain the urethane resin film include methyl ethyl ketone, toluene, ethyl acetate, isopropyl alcohol, etc.

There may also be added to the resin solution, in addition to an isocyanate-based crosslinking agent, an inorganic or organic fine powder of calcium carbonate, colloidal silica, cellulose, protein, PMMA resin or the like.

The thickness of the resin film here may be from about 0.1–10 μm. A greater coating coverage gives a greater improvement in water pressure resistance.

The coating method used may be a method employing a knife coater or gravure coater for coating on the non-porous urethane resin layer. The coated resin solution is dried at a temperature of about 100–160° C. with an air oven or the like to obtain a non-porous film.

This is followed by known water repellant treatment using a fluorine-based water repellant, silicon-based water repellant or the like and then set finishing for stretching and standard adjustment at 100–150° C., to obtain a moisture-permeable waterproof fabric. If necessary, the water repellant treatment may be followed by paper treatment and so forth.

A moisture-permeable waterproof fabric obtained in this manner having a non-porous urethane layer and film of at least two different types exhibits an improved waterproof property and enhanced waterproof durability, without a reduction in moisture permeation.

The material of the textile fabric used for the invention may be chemical fibers of polyester, nylon, acryl, rayon or the like, natural fibers of cotton, hemp, wool or the like, or mixed fibers thereof, and there are no particular restrictions. They may also be in any desired form such as a woven fabric, knitted fabric, nonwoven fabric, etc.

The film and moisture-permeable waterproof fabrics described in the present specification were evaluated by the following methods.

A) Moisture swelling degree of non-porous urethane film and adhesive layer

The urethane resin solution was coated onto the release sheet to a thickness of 0.08 mm, dried at 120° C. for 3 minutes and allowed to stand for 18 hours, after which the film was released, cut to a size of 5×5 cm and immersed for 5 minutes in running tap water, and then taken out and weighed to determine its weight increase.

The moisture swelling degree of the adhesive layer was measured in the same manner.

B) Moisture permeability of moisture-permeable waterproof fabric

This was measured according to the JIS L-1099 A-1 (calcium chloride) method and the B-1 (potassium acetate) method. The result was expressed based on 24 hours.

C) Water pressure resistance of moisture-permeable waterproof fabric

This was measured according to JIS L-1092 B. In cases where the sample stretched upon application of the water pressure, a nylon taffeta (density: warp+weft=about 210 filaments) or the like was combined with the sample prior to mounting on the tester for measurement. The washing method for measurement of the water pressure resistance retention ratio after washing was according to JIS L-0217 103, and the water pressure resistance before washing (initial) and after washing 10 times (after washing) were compared.

D) Moisture condensation of moisture-permeable waterproof fabric

The sample was wrapped around a 500 ml beaker containing 500 ml of hot water at 40° C. with the resin film side (or the inner side when used as clothing in cases where both sides were fiber materials) facing the beaker, and this was fixed with a rubber band. The beaker was allowed to stand for one hour in a thermo-hygrostat under conditions of 10° C., 60% RH. The amount of water droplets adhering to the resin film surface after one hour was measured to determine the moisture condensation, which was converted into units of $g/m^2 \cdot hr$.

E) Evaluation of film strength by washing

A fully automatic washing machine (by Mitsubishi Electric Co.) was used for treatment comprising 10 minutes of washing, 2 minutes of spinning and 5 minutes of rinsing, and this was followed by drying in a tumbler. After repeating this cycle 20 times, the degree of damage to the urethane film surface was observed.

The present invention will now be further explained by way of the following examples. The term "parts" in the examples refers to parts by weight.

The ether-based urethane resin (solid portion: 30%) for the urethane resin solutions used in the examples was a polyurethane resin comprising polyethylene ether glycol with a molecular weight of about 2000, ethylene glycol and 4,4'-diphenylmethane diisocyanate, the resin having an oxyethylene group content of 53%, and it was prepared as a DMF solution of the polyurethane with a chain extender content of 10%. Also, the ether-based urethane resin (solid portion: 50%) for the adhesive urethane solutions used in the examples was a polyester ether-based urethane resin, prepared as a solution of the polyurethane resin with an oxyethylene group content of 25% in a mixed solvent of toluene, methyl ethyl ketone and DMF.

EXAMPLE 1

A resin solution was prepared with the following composition for a urethane resin layer with a moisture swelling degree of 85%.

| | |
|---|---|
| Urethane resin solution | 100 parts |
| Ether-based urethane resin (solid portion: 30%) | |
| Methyl ethyl ketone | 70 parts |
| White pigment | 8 parts |

The resin was coated onto a release sheet to a thickness of 0.1 mm and dried at 120° C. to obtain a non-porous urethane resin layer. The urethane resin layer was then coated to a thickness of 0.1 mm with an adhesive solution having the following composition for a cured film with a moisture swelling degree of 30%, dried at 120° C., combined with a nylon oxford fabric, and then pressed with a hot press roll at a temperature of 120° C. and a pressure of $1.5 \text{ kg/cm}^2$.

| | |
|---|---|
| Adhesive urethane solution | 100 parts |
| Ether-based urethane resin (solid portion: 50%) | |
| Toluene | 30 parts |
| Methyl ethyl ketone | 10 parts |
| Takenate WD-725 | 9 parts |
| (hydrophilic group-containing aliphatic isocyanate by Takeda Yakuhin Kogyo) | |
| Curing catalyst HI215 | 0.5 part |
| (product of Dainichi Seika) | |

Asahi Guard AG5690 (fluorine-based water repellant by Asahi Glass, KK.) was then used for water repellant treatment, and set finishing was carried out at 140° C. to obtain a moisture-permeable waterproof fabric. The properties of the resulting moisture-permeable waterproof fabric are listed in Table 1.

Comparative Example 1

A urethane resin solution with the following composition for a urethane resin layer with a moisture swelling degree of 5% was used for coating and drying on a release sheet in the same manner as Example 1.

| Urethane resin solution Y210B | 100 parts |
|---|---|
| (Moisture permeation urethane resin by Dainichi Seika) | |
| Methyl ethyl ketone | 80 parts |
| N,N-dimethylformamide | 10 parts |
| White pigment | 8 parts |

The resin was coated onto a release sheet to a thickness of 0.1 mm and dried at 120° C. to obtain a non-porous urethane resin layer. The urethane resin layer was then coated to a thickness of 0.1 mm with an adhesive solution having the following composition for an adhesive layer with a moisture swelling degree of 2% and dried at 120° C. to obtain an adhesive layer which was then combined with a nylon oxford fabric, and subsequently pressed with a hot press roll at a temperature of 120° C. and a pressure of 1.5 kg/cm$^2$.

| Adhesive urethane solution Y119E | 100 parts |
|---|---|
| (Moisture permeation urethane adhesive by Dainichi Seika) | |
| Toluene | 70 parts |
| Methyl ethyl ketone | 10 parts |
| Coronate HL | 10 parts |
| (aliphatic isocyanate by Nihon Polyurethane Kogyo) | |
| Curing catalyst HI215 | 1 part |
| (product of Dainichi Seika) | |

Asahi Guard AG5690 (fluorine-based water repellant by Asahi Glass, KK.) was then used for water repellant treatment, and set finishing was carried out at 140° C. to obtain a moisture-permeable waterproof fabric. The properties of the resulting moisture-permeable waterproof fabric are listed in Table 1.

Comparative Example 2

A resin solution was prepared with the following composition for a urethane resin layer with a moisture swelling degree of 85%.

| Urethane resin solution | 100 parts |
|---|---|
| Ether-based urethane resin (solid portion: 30%) | |
| Methyl ethyl ketone | 70 parts |
| N,N-dimethylformamide | 10 parts |
| White pigment | 8 parts |

A solution was prepared with the following composition for an adhesive layer with a moisture swelling degree of 2% instead of the adhesive solution of Example 1.

| Adhesive urethane solution Y119E | 100 parts |
|---|---|
| (Moisture permeation urethane adhesive by Dainichi Seika) | |
| Toluene | 70 parts |
| Methyl ethyl ketone | 10 parts |
| Coronate HL | 10 parts |
| (aliphatic isocyanate by Nihon Polyurethane Kogyo) | |
| Curing catalyst HI215 | 1 part |
| (product of Dainichi Seika) | |

These solutions were used to obtain a moisture-permeable waterproof fabric by treatment according to the same procedure as in Example 1. The results of measurement of its properties are listed in Table 1.

Comparative Example 3

A resin solution was prepared with the following composition for a urethane resin layer with a moisture swelling degree of 5%.

| Urethane resin solution Y210B | 100 parts |
|---|---|
| (Moisture permeation urethane resin by Dainichi Seika) | |
| Methyl ethyl ketone | 70 parts |
| N,N-dimethylformamide | 10 parts |
| White pigment | 8 parts |

A resin solution was prepared with the following composition as an adhesive solution for an adhesive layer with a moisture swelling degree of 30%.

| Adhesive urethane solution | 100 parts |
|---|---|
| Ether-based urethane resin (solid portion: 50%) | |
| Toluene | 30 parts |
| Methyl ethyl ketone | 10 parts |
| Takenate WD-725 | 9 parts |
| (hydrophilic group-containing aliphatic isocyanate by Takeda Yakuhin Kogyo) | |
| Curing catalyst HI215 | 0.5 part |
| (product of Dainichi Seika) | |

These solutions were used to obtain a moisture-permeable waterproof fabric by treatment according to the same procedure as in Example 1. The results of measurement of its properties are listed in Table 1.

EXAMPLE 2

A resin solution was prepared with the following composition for a urethane resin layer with a moisture swelling degree of 85%.

| Urethane resin solution | 100 parts |
|---|---|
| Ether-based urethane resin (solid portion: 30%) | |
| Methyl ethyl ketone | 70 parts |
| N,N-dimethylformamide | 10 parts |
| White pigment | 8 parts |

The resin was coated onto a release sheet to a thickness of 0.1 mm and dried at 120° C. to obtain a non-porous urethane resin layer. The urethane resin layer was then coated to a thickness of 0.1 mm. with an adhesive solution having the following composition for an adhesive layer with a moisture swelling degree of 30%, dried at 120° C. and combined with a polyester plain weave fabric, and then pressed with a hot press roll at a temperature of 120° C. and a pressure of 1.5 kg/cm$^2$.

| | |
|---|---|
| Adhesive urethane solution | 100 parts |
| Ether-based urethane resin (solid portion: 50%) | |
| Toluene | 30 parts |
| Methyl ethyl ketone | 10 parts |
| Takenate WD-725 | 9 parts |
| (hydrophilic group-containing aliphatic isocyanate by Takeda Yakuhin Kogyo) | |
| Curing catalyst HI215 | 0.5 part |
| (product of Dainichi Seika) | |

A 100 mesh gravure roll was then used to coat the urethane resin layer side of the resulting fabric with a two-component type polyurethane resin solution with the following composition for a film with a moisture swelling degree of 65%, and it was dried at 120° C.

| | |
|---|---|
| Two-component type polyurethane resin solution | 100 parts |
| Two-component type ether-based polyurethane resin (solid portion: 30%) | |
| Coronate HL | 2 parts |
| (aliphatic isocyanate by Nihon Polyurethane Kogyo) | |
| Curing catalyst HI215 | 1 part |
| (product of Dainichi Seika) | |

The above-mentioned two-component type ether-based polyurethane resin is a solution in a solvent which is a mixed solvent of toluene, methyl ethyl ketone, sec-butyl alcohol and DMF, with a DMF content of 3%.

Asahi Guard AG5690 (fluorine-based water repellant by Asahi Glass, KK.) was then used for water repellant treatment, and set finishing was carried out at 140° C. to obtain a moisture-permeable waterproof fabric.

The results of measurement of the properties of the resulting moisture-permeable waterproof fabric are shown in Table 2 in comparison with those of the moisture-permeable waterproof fabric obtained in Example 1.

TABLE 1

| | Example 1 | Comp. Example 1 | Comp. Example 2 | Comp. Example 3 |
|---|---|---|---|---|
| Moisture permeability | | | | |
| A-1 method | 4,400 | 3,800 | 4,300 | 4,000 |
| B-1 method | 21,000 | 3,500 | 6,000 | 5,300 |
| Moisture condensation | 0 | 45 | 35 | 25 |
| Water pressure resistance | | | | |
| Initial | ≧20,000 | ≧20,000 | ≧20,000 | ≧20,000 |
| After washing | ≧20,000 | ≧20,000 | ≧20,000 | ≧20,000 |

TABLE 2

| | Example 1 | Example 2 |
|---|---|---|
| Moisture permeability | | |
| A-1 method | 4,400 | 4,100 |
| B-1 method | 21,000 | 23,000 |
| Moisture condensation | 0 | 2 |
| Water pressure resistance | | |
| Initial | ≧20,000 | ≧20,000 |
| After washing | ≧20,000 | ≧20,000 |
| Evaluation of film strength by washing | Small holes seen on surface | No small holes seen on surface |

EXAMPLE 3

A resin solution was prepared with the following composition for a urethane resin layer with a moisture swelling degree of 85%.

| | |
|---|---|
| Urethane resin solution | 100 parts |
| Ether-based urethane resin (solid portion: 30%) | |
| Methyl ethyl ketone | 70 parts |
| White pigment | 8 parts |

The resin was coated onto a release sheet to a thickness of 0.1 mm and dried at 120° C. to obtain a non-porous urethane resin layer.

An adhesive solution was then prepared with the following composition.

| | |
|---|---|
| Adhesive solution | 100 parts |
| AH550 urethane resin (solid portion: 50%) | |
| (hot melt polyurethane resin by Dainihon Ink Kagaku Kogyo) | |
| Toluene | 50 parts |

The resin solution was coated with a gravure roll onto the above-mentioned urethane resin layer in the form of 0.5 mm circular dots and dried at 120° C., to obtain a release sheet-attached moisture-permeable resin film comprising a non-porous urethane resin layer and a hot melt urethane adhesive layer.

Next, the adhesive layer side of the release sheet-attached moisture-permeable resin film was combined with the back side of a tropical weave fabric composed of 100% wool, and a pressing machine was used for pressing from the release sheet side for 15 seconds under conditions of 140° C. temperature and 1 kg/cm$^2$ pressure.

The moisture permeability (B-1 method) of the resulting moisture-permeable resin film-provided wool fabric was 16,000 g/m$^2$·24 hr, the water pressure resistance was 21,000 mmH$_2$O and the moisture condensation was 3 g/m$^2$·24 hr.

INDUSTRIAL APPLICABILITY

The moisture-permeable waterproof fabric of the invention is highly useful because it rapidly releases water vapor, generated by the body, out of the clothing and also releases water droplets produced by the difference between the clothing interior and the outer temperature, while also preventing water leakage, without steaminess or stickiness occurring inside the clothing even during periods of work or exercise under harsh environments.

What is claimed is:

1. A moisture-permeable waterproof fabric, comprising a textile fabric and a moisture-permeable resin film containing a non-porous resin layer formed on at least one side thereof, wherein said moisture-permeable resin film includes said non-porous urethane resin layer and an adhesive layer, wherein said adhesive includes a urethane resin, and an aliphatic isocyanate is used as the curing agent therefor, wherein the moisture-permeable waterproof fabric has a moisture permeability of 15,000 g/m$^2$·24 hr or greater according to the potassium acetate method, a moisture condensation of no more than 5 g/m$^2$·hr and a water pressure resistance of 20,000 mmH$_2$O or greater.

2. A moisture-permeable waterproof fabric according to claim 1, wherein the moisture swelling degree of said non-porous urethane resin layer is at least 60%, and the moisture swelling degree of said adhesive layer is at least 20%.

3. A moisture-permeable waterproof fabric according to claim 1, wherein there is included on said non-porous urethane resin layer a nonporous film which includes a two-component type polyurethane resin and has a moisture swelling degree of at least 50%.

* * * * *